(12) United States Patent
Spencer

(10) Patent No.: US 7,088,918 B1
(45) Date of Patent: Aug. 8, 2006

(54) MOUNTING DEVICE FOR A CAMERA WITH AUTOMATIC EXPOSURE MODE TO AN OPTICAL SYSTEM

(75) Inventor: Randolph Spencer, Spring Hill, FL (US)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 55 days.

(21) Appl. No.: 10/905,825

(22) Filed: Jan. 21, 2005

(51) Int. Cl.
*G03B 17/48* (2006.01)

(52) U.S. Cl. ............... 396/432; 396/530; 396/546

(58) Field of Classification Search ............. 396/71, 396/432, 530, 532, 542; 348/75, 79, 360, 348/363; 600/112, 109
See application file for complete search history.

(56) References Cited

U.S. PATENT DOCUMENTS 4,478,212 A  10/1984  Asano ................ 128/6
4,803,509 A * 2/1989  Nakai et al. ........ 396/170
6,462,771 B1 10/2002  Kitagawa ........... 348/79

FOREIGN PATENT DOCUMENTS

DE    G 89 14 417.1    4/1990
DE    200 10 421 U 1   11/2000

* cited by examiner

*Primary Examiner*—W. B. Perkey
*Assistant Examiner*—Robert C. Do
(74) *Attorney, Agent, or Firm*—Simpson & Simpson PLLC

(57) ABSTRACT

A mounting device for a camera with automatic exposure mode to an optical system is disclosed. An adapter tube has a first and a second end, wherein the first end is attached to the camera and the second end is attached to the optical system. A mounting element, provided at the first end, provides the mechanical connection to the camera. A plurality of electric contact pins, located at the first end, cooperates with respective electric contacts provided at the camera.

12 Claims, 3 Drawing Sheets

MOUNTING DEVICE FOR A CAMERA WITH AUTOMATIC EXPOSURE MODE TO AN OPTICAL SYSTEM

FIELD OF THE INVENTION

The invention concerns a mounting device for a camera with automatic exposure mode to an optical system.

BACKGROUND OF THE INVENTION

It is important for users to attach a digital or conventional camera to an optical system in order to take pictures with the camera. In order to do so the lens of the camera needs to be removed and an adapter is used to mount the camera to the optical system. An additional feature for the user is to use the automatic mode of the camera for taking the pictures. The user should not be bothered with any manual settings of the camera. It would be extremely inconvenient for a user if he has to interrupt the observation in order to set the camera.

U.S. Pat. No. 4,478,212 shows an adapter for coupling a camera adapted to receive power from an endoscope to which the camera is coupled. The adapter is coupled between the ocular section of the endoscope and the mounting of the taking lens of the camera. The adapter has electric power terminals for providing the camera with electric power. The adapter can have a built in power source or a plug-in power source. There is no indication that the adapter simulated the presence of an objective to the camera.

German Utility Model DE 200 10 421 U1 discloses an adapter for attaching a camera to the photo tube of a microscope. Between the camera and the pipe like photo tube the adapter is provided. The mounting means enables an alignment between the optical axis of the camera and the optical axis of the microscope.

U.S. Pat. No. 6,462,771 discloses a still-picture acquisition method and device. A still-picture acquisition section in a computer selects a brightness-periodically-varying portion of image data of a living cell like a cardiac cell, as a sample, which makes a self-ordered periodic motion, monitors a change in brightness, and generates a trigger signal at the timing at which the value of the brightness exceeds a specific threshold value. This causes a camera body to repeatedly pick up the image of the living cell after a predetermined delay time and then averages the picked-up images. There is no indication of the use of a conventional camera to pick-up the images from the microscope.

SUMMARY OF THE INVENTION

It is the object of the present invention to create a mounting device for a camera with automatic exposure mode to an optical system, which allows the user to use the automatic exposure mode of the camera when the lens is removed.

This object is achieved by way of a mounting device for a camera with automatic exposure mode to an optical system. An adapter tube is provided which has a first and a second end, wherein the first end is attached to the camera and the second end is attached to the optical system. A mounting element attached to the first end provides the mechanical connection to the camera. A plurality of electric contact pins are located at the first end which cooperate with respective electric contacts provided at the camera. A printed circuit board is connected via the electric contact pins to the camera, wherein the printed circuit board simulates to the camera the presence of a regular photographic lens.

The printed circuit board comprises a microchip, which simulates the presence of a regular photographic lens. Additionally, the printed circuit board is designed as a flexible circuit board. An optical axis, defined by the optical system, runs essentially in the center of the adapter tube. The mounting portion of the adapter provided at the first end is an N-mount. An inner tube is positioned symmetrically around an optical axis and is surrounded by the N-mount. The inner tube carries the printed circuit board and a contact holder for the plurality of electric contact pins. The contact holder is a curved plate, which exhibits a similar curvature as the arrangement of the electric connections at the camera.

BRIEF DESCRIPTION OF THE DRAWINGS

The invention will be described below by way of example and with reference to the appended figures, from which further features, advantages, and objects to be achieved may be inferred. In the figures.

DETAILED DESCRIPTION OF THE INVENTION

Figure 1:
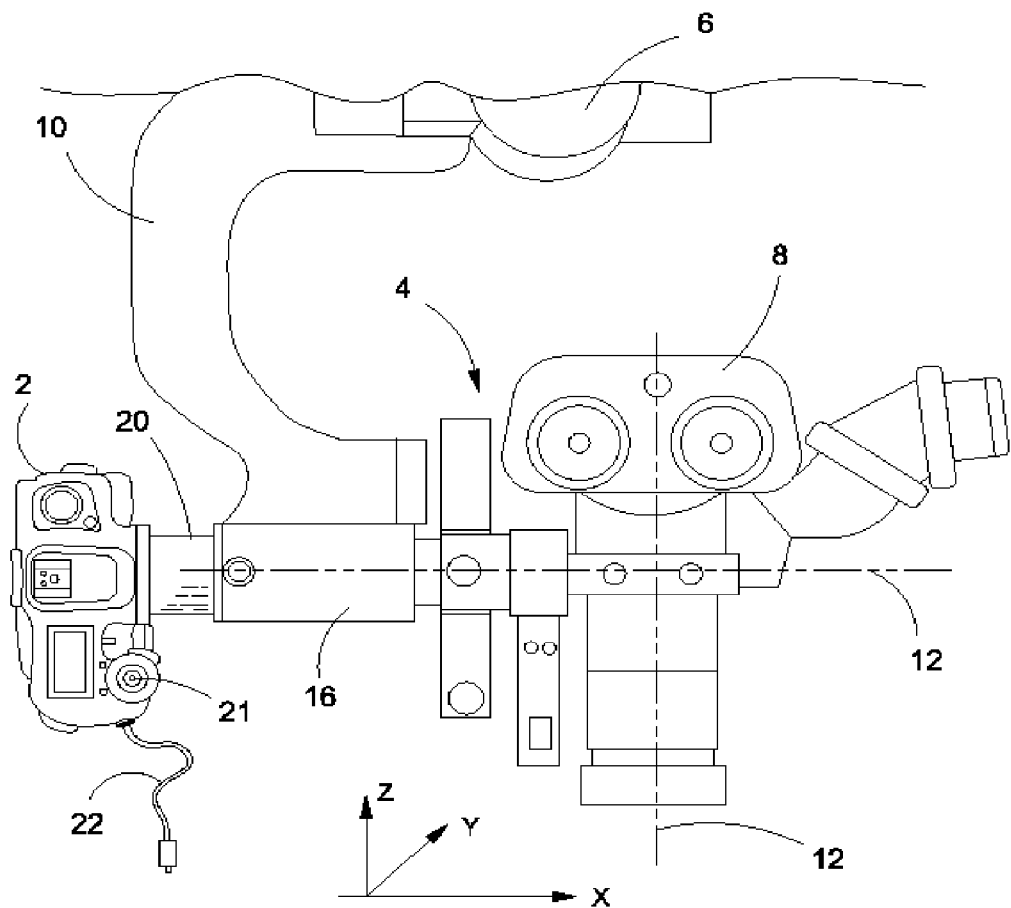
FIG. 1 is a schematic representation of a camera attach to an optical system, wherein the optical system is in the present case a surgical microscope.

FIG. 1 is a schematic representation of a camera 2 attach to an optical system 4. The optical system 4 is in the present case a surgical microscope 6. It is immediately evident to a person skilled in the art that the optical system is not limited to a surgical microscope 6. The optical system may encompass as well a conventional microscope, an inverted microscope, a stereo microscope or a telescope.

In the embodiment as shown in FIG. 1 the surgical microscope 6 comprises at least one stereo microscope 8 which is mounted to a freely movable stand 10. In order to reach the optimal position of the stereo microscope 8 with respect to the location to be observed or worked on. The stand 10 can be moved freely in space defined by the x-direction, the y-direction and the z-direction. The stereo microscope 8 defines an optical beam path 12 around which the optical elements are arranged symmetrically. A coupling element 16 is mounted to the body of the stereo microscope 8 in order to couple out a portion of the light in the optical beam path 12. In the present case the coupled out light is used for photographic purposes. Therefore, a camera 2 with automatic exposure mode is mounted to the coupling element 16 with an adapter 20. The lens of the camera 2 with automatic exposure mode is removed in order to mount the camera 2 with the adapter 20 to the optical system 4. Additionally, a remote control 22 is provided which allows the user to take pictures without the need to operate the picture taking button 21 of the camera 2. Additionally, the stereo microscope 8 can be equipped with one or more viewing positions for an additional user.

Figure 2:
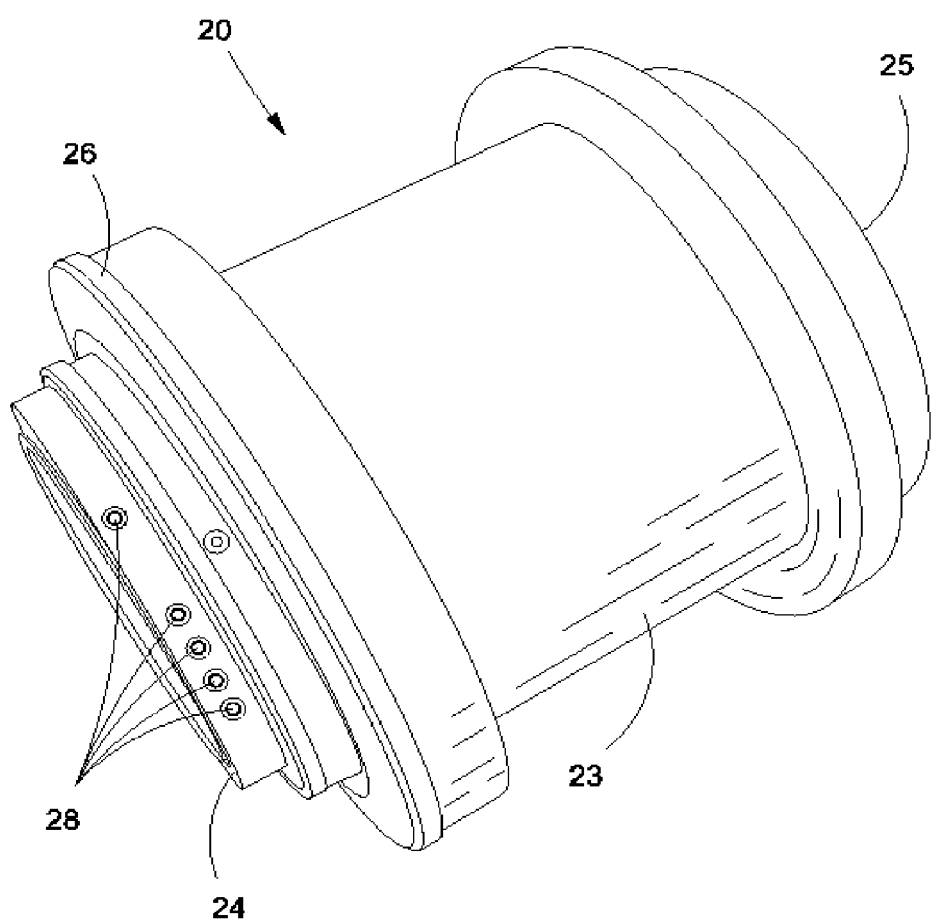
FIG. 2 is a perspective view of the adapter.
Figure 3:
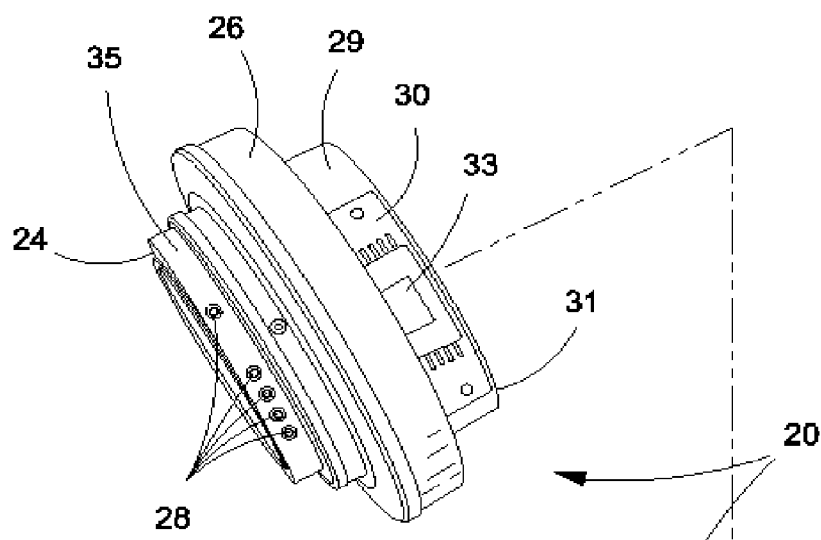
FIG. 3 is an exploded view of the adapter, showing the first end of the adapter which is attached to the camera body; and, FIG. 4 is an exploded view of the adapter, showing the second end of the adapter which is attached to the optical system.
Figure 4:
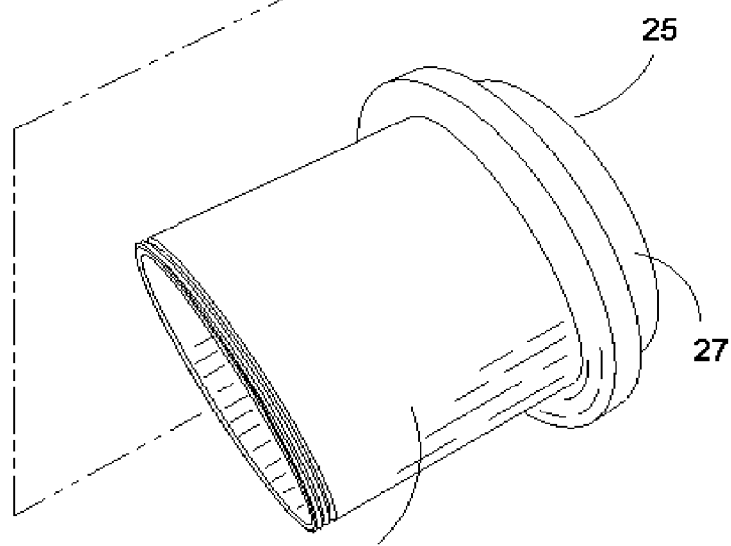

FIG. 2 shows the adapter 20 for the camera 2 to the optical system 4. The adapter 20 is designed as an adapter tube 23 which has a first end 24 and a second end 25. The first end 24 is attached to the camera 2 and the second end 25 is attached to the optical system 4. A mounting element 26 is provided at the first end 24, which provides the mechanical connection to the camera 2. A plurality of electric contact pins 28 are located at the first end 24 which cooperate with respective electric contacts (not shown) provided at the camera 2;

FIG. 3 and FIG. 4 show the exploded view of the adapter 20 which is used to attach a camera 2 to an optical system 4. The adapter 20 has a tube like structure with a first end 24 and a second end 25. The first end 24 is attached to the camera 2 and the second end 25 is attached to the optical system 4. The adapter 20 is mounted to the optical system 4 in a way that the beam path 12 of the optical system 4 runs in the center of the adapter. The second end 25 of the adapter 20 which mounts to the optical system 4 has a dove tail like structure 27 formed. The dove tail like structure 27 mounts to a corresponding element (not shown) at the optical system 4.

The mounting element 26 is provided at the first end 24 of the adapter is mounted to the adapter tube 23 via a thread. The mounting element 26 carries an inner tube 31. In the assembled stage, (see FIG. 2), the inner tube 31 is completely surrounded by the adapter tube 23. A printed circuit board 30 is mounted to an outer surface 29 of the inner tube 31. The electric contact pins 28 at the mounting element 26 provide an electric connection to the camera 2. The purpose of the printed circuit board 30 is to simulate to the camera 2 the presence of a regular photographic lens. The printed circuit board 30 comprises a microchip 33. The printed circuit board is made flexible in order to fit to the curved shape of the inner tube 28. The mounting portion of the adapter 20 provided at the first end 24 is an N-mount. The inner tube 31 carries the printed circuit board 30 and a contact holder 35 for the plurality of electric contact pins 28.

What is claimed is:

1. A mounting device for a camera with automatic exposure mode to an optical system comprising: an adapter tube which has a first and a second end, wherein the first end is attached to the camera and the second end is attached to the optical system, a mounting element provided at the first end which provides the mechanical connection to the camera, a plurality of electric contact pins are located at the first end which cooperate with respective electric contacts provided at the camera; and a printed circuit board which has via the electric contact pins an electric connection to the camera, wherein the printed circuit board simulates to the camera the presence of a regular photographic lens.

2. The device as defined in claim 1, wherein the printed circuit board comprises a microchip, which simulates the presence of a regular photographic lens.

3. The device as defined in claim 1, wherein the printed circuit board is a flexible circuit board.

4. The device as defined in claim 1, wherein an optical axis defined by the optical system runs essentially in the center of the adapter tube.

5. The device as defined in claim 1, wherein the mounting portion of the adapter provided at the first end is an N-mount.

6. The device as defined in claim 1, wherein an inner tube is positioned symmetrically around an optical axis and is surrounded by the N-mount.

7. The device as defined in claim 6, wherein the inner tube carries the printed circuit board and a contact holder for the plurality of electric contact pins.

8. The device as defined in claim 7, wherein the contact holder is a curved plate, which exhibits a similar curvature as the arrangement of the electric connections at the camera.

9. The device as defined in claim 1, wherein the optical system is a surgical microscope.

10. The device as defined in claim 1, wherein the optical system is a conventional microscope.

11. The device as defined in claim 1, wherein the optical system is a stereo microscope.

12. The device as defined in claim 1, wherein the optical system is a telescope.

* * * * *